United States Patent [19]

Goforth

[11] Patent Number: 5,062,208
[45] Date of Patent: Nov. 5, 1991

[54] METHOD OF MOLDING A BEARING SEPARATOR

[75] Inventor: William R. Goforth, Pontiac, Mich.

[73] Assignee: General Motors Corporation, Detroit, Mich.

[21] Appl. No.: 575,696

[22] Filed: Aug. 31, 1990

[51] Int. Cl.⁵ ............................................. B21D 53/12
[52] U.S. Cl. ........................... 29/898.049; 29/898.048; 29/898.05; 29/898.067; 264/318
[58] Field of Search ...................... 29/898.048, 898.049, 29/898.05, 898.066, 898.067, 898.12; 425/438; 264/318, 334

[56] References Cited
U.S. PATENT DOCUMENTS

| 4,073,552 | 2/1978 | Christy | 308/201 |
| 4,330,160 | 5/1982 | Stolz et al. | 308/201 |
| 4,362,687 | 12/1982 | Olschewski et al. | 264/318 |
| 4,420,195 | 12/1983 | Christen | 308/201 |
| 4,451,098 | 5/1984 | Farley et al. | 308/201 |

Primary Examiner—Timothy V. Eley
Assistant Examiner—C. Richard Martin
Attorney, Agent, or Firm—Patrick M. Griffin

[57] ABSTRACT

A bearing separator having complete, wrapping ball pockets is molded by use of a pocket shaping insert that is split along a diagonal plane, allowing each insert segment to be withdrawn from the pocket formed with reduced stress.

2 Claims, 4 Drawing Sheets

METHOD OF MOLDING A BEARING SEPARATOR

This invention relates to bearing separators in general, and specifically to a method of molding a plastic bearing separator with complete, wrapping pockets.

BACKGROUND OF THE INVENTION

Rolling bearing assemblies generally include bearing separators. These bearing separators serve to space the rolling elements from one another and may also self retain the rolling elements as a separate subassembly, depending on the type of bearing.

In the case of Conrad ball bearings, the bearing separator is inserted last, after the bearing balls are in place, so there is no need for a separator-ball subassembly. Access for adding the separator may be available from only one side of the bearing, or from both sides. A Conrad bearing in which access for separator installation is only available from one side is shown in U.S. Pat No. 4,420,195. This type of bearing uses a one piece separator having flexible retaining pockets that are force fitted around the bearing balls. Such separators necessarily have incomplete pockets, that is, pockets that do not completely encircle the bearing balls along any plane of the ball. Such separators are easy to mold, however, in that the molding insert around which the incomplete pocket is formed can be fairly easily withdrawn.

If access for installing the bearing separator into a Conrad bearing is available from both sides, a separator having complete pockets, that is pockets that completely encircle some plane through the rolling elements, can be provided. However, in such a case, the bearing separator is split into two parts or halves, such as is shown in U.S. Pat. No. 4,451,098. The two halves of the separator form complete pockets around the bearing balls when they are joined, but require both an additional part and additional assembly step, as compared to one piece cages.

For other types of bearings such as thrust, linear sliding, and split race bearings, a separator-bearing element subassembly is both possible and useful. Bearing retainers having complete pockets are preferred over those having incomplete pockets, since they provide better bearing element retention. Most preferred of all are separators with pockets that are not only complete, but which also conform to a significant portion of the outer surface of the bearing element, since they provide more secure retention. Such pockets are referred to as wrapping pockets. Complete, wrapping pockets may be easily formed by multipiece separators, however, as noted above, one piece separators are preferred.

One piece separators are most frequently made of plastic, since it is relatively inexpensive and, in general, easy to mold. However, one piece plastic separators having complete, wrapping pockets are difficult to mold. The difficulty flows from the fact that the pocket will conform to the molding insert around which the pocket is formed to at least the same degree that it would conform to the bearing element it is designed to hold. This makes it at least as difficult to withdraw the molding insert as it would be to dislodge the bearing element. Furthermore, the molding insert is typically withdrawn from the pocket at a time when the plastic is not fully cooled, and more subject to deformation. One way in which complete, wrapping pockets can be molded is to mold the separator from a relatively soft and yielding material, allowing the insert to be easily withdrawn. Such a design is disclosed in U.S. Pat. No. 4,073,552. This design is limited, however, in that such a soft material will also be limited in how securely it can retain the bearing elements.

Rigid plastic separators may be molded in one piece, with complete pockets, by using a bypass molding technique, as shown in U.S. Pat. No. 4,330,160. However, bypass molded pockets are limited in that their concave inner surface can conform to no more than 180 degrees of the surface of the bearing element, as will be described in detail below, and would thus not be considered to be wrapping pockets.

SUMMARY OF THE INVENTION

The invention provides a method of injection molding a one piece, rigid plastic bearing separator with complete, wrapping pockets.

The separator produced according to the invention has rolling elements, such as balls or rollers, each of which has a cross section of a predetermined width. The concave interior pocket surface has a central plane with an interior width that is substantially equal to the rolling element's predetermined width, and a pair of narrower pocket openings opposed along an axis perpendicular to the central plane. The method allows a wrapping interior pocket surface to be molded with a minimum of stress to the pocket surface material when the mold insets are withdrawn.

The method includes providing a shaping insert whose outer surface substantially conforms to the pocket interior surface. This shaping insert is divided into two segments along a plane that is tilted out of the pocket's central plane. As such, a projection of each insert segment along the axis will have an effective width less than the pocket interior width. The two insert segments are adjoined along the dividing plane, and plastic is injected around the insert segments to form the pockets. The insert segments are then withdrawn axially out of respective opposed pocket openings. Stress to the pocket openings is reduced, since the effective width of the inserts withdrawn through them is reduced.

It is, therefore, a general object of the invention to provide a method of molding a one piece, rigid bearing separator with complete, wrapping pockets while reducing the stress to the pocket openings.

It is another object of the invention to provide a method of making a bearing separator of the type described that incorporates a divided shaping insert whose segments have a reduced effective width, and can thereby be axially withdrawn from the pocket without over stressing the pocket openings.

DESCRIPTION OF THE PREFERRED EMBODIMENT

These and other objects and features of the invention will appear from the following written description and from the drawings, in which.

Figure 1:
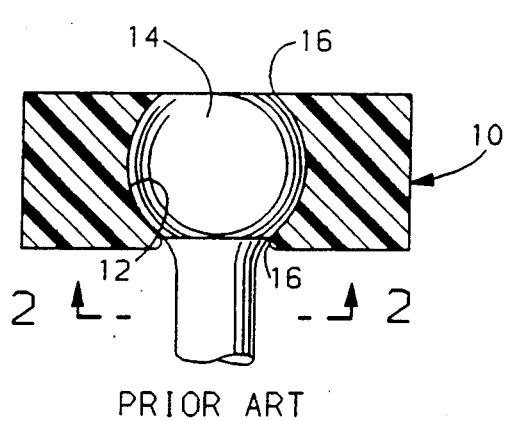
FIG. 1 shows a cross section of a known pocket shaping molding insert.
Figure 2:
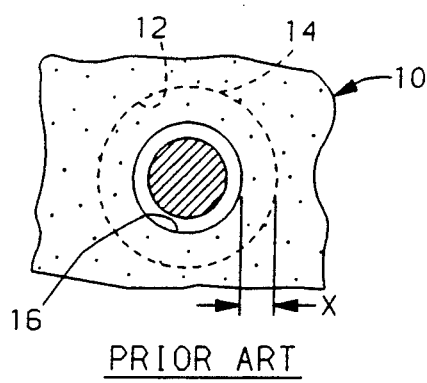
FIG. 2 shows a sectional view taken along line 2—2 of FIG. 1.

FIGS. 1 and 2 depict a bearing separator, indicated generally at 10, with a complete, wrapping concave pocket 12. Pocket 12 is formed by a conventional shaping insert 14, which basically matches the size of the bearing ball that pocket 12 would eventually retain. Pocket 12 has two opposed circular openings 16, through which the exposed bearing ball would be exposed to the bearing race pathways. Insert 14 would be withdrawn through the lower pocket opening 16 at a time when the plastic material was still relatively warm, and subject to deformation. The degree to which the lower pocket opening 16 would be stressed is proportional to the insert 14-pocket opening 16 radius difference, labeled as X. Lower opening 16 would be stressed around its entire perimeter to that degree, since it would have to open that much to allow insert 14 to be withdrawn through it.

Figure 3:
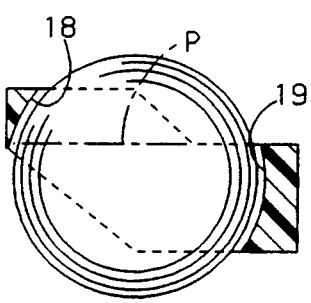
FIG. 3 shows a cross section of a prior art bypass molded bearing separator.

Referring next to FIG. 3, a bearing separator pocket formed according to the technique disclosed in U.S. Pat. No. 4,330,160 referred to above is shown. The pocket consists of two diagonally opposed parts, 18 and 19, each of which is formed by a separate molding insert, not shown. The separate molding inserts part along the line P, with a straight axial draw. There is no resistance to withdrawing the inserts, no resilient "pot out" from the pocket, and thus no stress to the pocket openings. However, while the pocket so formed is complete, it is not a true wrapping pocket, as the term is intended here. That is, as noted above, the two portions 18 and 19, as shown in cross section, inevitably comprise only 180 degrees or less. Bearing element retention force is thus limited.

Figure 4:
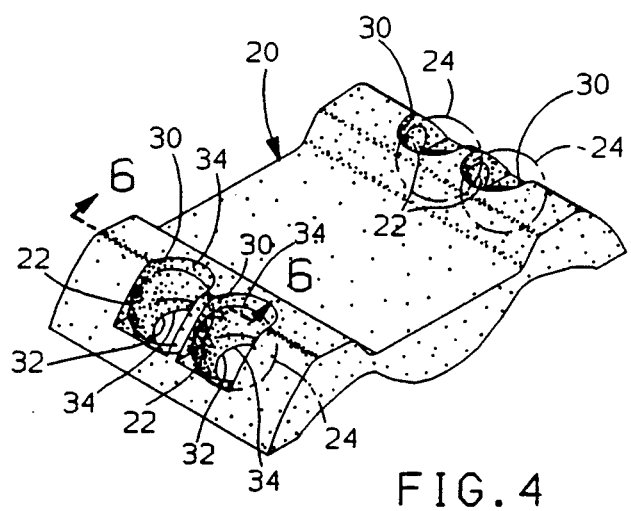
FIG. 4 shows a perspective view of a bearing separator made according to the invention.
Figure 5:
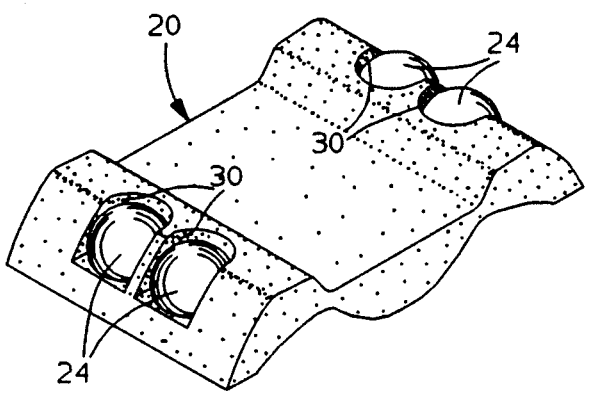
FIG. 5 is similar to FIG. 4, but with rolling bearings seated in the pockets.
Figure 6:
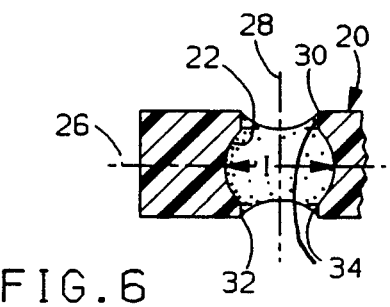
FIG. 6 shows a sectional view taken along line 6—6 of FIG. 4.

Referring next to FIGS. 4 through 6, a preferred embodiment of a bearing separator produced according to the method of the invention is indicated generally at 20. Bearing separator 20 has pockets 22 that are complete, and which also conform to enough of the outer surface of a retained bearing element, which is a bearing ball 24, to constitute true wrapping pockets. Each pocket 22 is symmetrical about a central plane 26, indicated by the horizontal dotted line, and about a central axis 28, indicated by the vertical dotted line. Bearing balls 24, like cylindrical rollers or any other rolling element, have a central cross section with a predetermined width. In the case of ball 24, this is the diameter. Pocket 22 is tailored to the diameter of ball 24 in order to retain it adequately. The interior width of pocket 22, indicated at I, is measured across the central plane 26, and is substantially equal to the diameter of ball 24. Opposite either side of central plane 26, along the central axis 28, are a pair of generally circular, identical pocket openings, an upper opening 30 and a lower opening 32. In the particular embodiment disclosed, the openings 30 and 32 are not perfectly circular, but elongated slightly into an oblong or oval shape. Thus, pocket 22, while it is a complete pocket that totally encircles ball 24, does not conform closely to ball 24 as seen in every cross section taken in a plane that includes its central axis 28. Pocket 22, as disclosed, has a pair of non conforming ends 34 that are separated, as measured in the direction perpendicular to the line 6—6 of FIG. 4, by more than the diameter of ball 24, and which would therefore not actually touch the retained ball 24. As seen in the cross section of FIG. 6, however, the width I of pocket 22 is substantially equal to the predetermined diameter of ball 24, and that is what is meant by the interior width of pocket 22. As seen in the FIG. 6 section, the openings 30 and 32 are also both smaller than the diameter of ball 24. The method of the invention is fundamentally intended to produce ball pockets that do conform all the way around, that is, pockets in which every cross section would look like FIG. 6, and in which the openings that are perfectly circular. Thus, in describing the method below, the pocket 22 will be treated as such. The non conforming ends 34 do provide a secondary advantage, however, described in more detail below.

Figure 7:
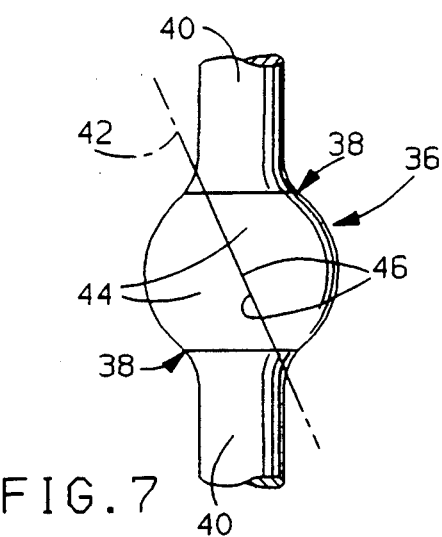
FIG. 7 shows a side view of a shaping insert divided into two segments, when the two insert segments are adjoined.
Figure 8:
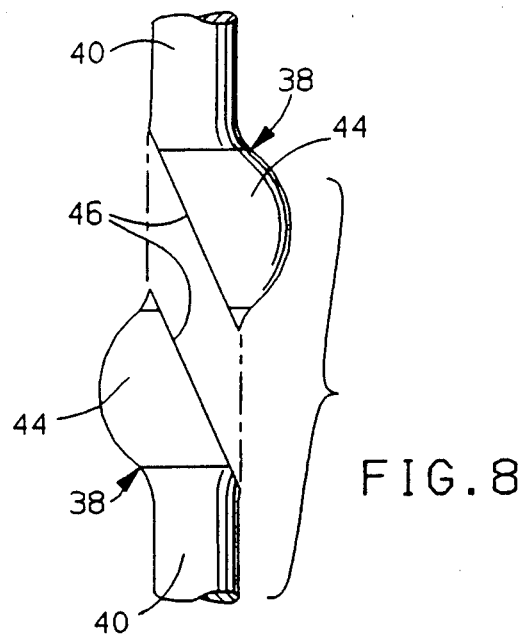
FIG. 8 is similar to FIG. 7, but with the two insert segments separated.

Referring next to FIGS. 6, 7 and 8, a shaping insert indicated generally at 36, is especially designed to mold a complete, wrapping pocket with reduced withdrawal stress. As disclosed, insert 36 is basically spherical, and would thus create a pocket that was basically spherical as well, with a cross section that looked like FIG. 6 in every direction. Unlike the prior art insert 14 described above, however, insert 36 is not a single piece. Insert 36 is divided into two identical segments 38, each of which has a central withdrawal rod 40 coaxial to the other withdrawal rod 40. The two insert segments 38 are divided along a plane 42 represented by the diagonal dotted line, a plane which passes through the center of the sphere that insert 36 comprises. Plane 42 is tilted out of the pocket central plane 26, to a degree determined by considerations described more fully below. Nor does plane 42 include the pocket central axis 28, and so may be termed a diagonal plane. Since they are divided along a diagonal plane, each insert segment 38 thus has a partially spherical outer surface 44, and a slanted inner surface 46, which may be called its guide surface. The guide surfaces 46 are abutted when the insert 36 is as shown in FIG. 7, and the two outer surfaces 44 then comprise a whole sphere, but for the coaxial withdrawal rods 40. When the two segments 38 are pulled apart by the withdrawal rods 40, the guide surfaces 46 move apart in parallel, as shown in FIG. 8. As a practical matter, each insert segment 38 would likely be made separately. However, as far as conceptualizing the method, each segment 38 may be thought of as being produced by cutting the whole insert 36 in two, along the plane 42.

Figure 11:
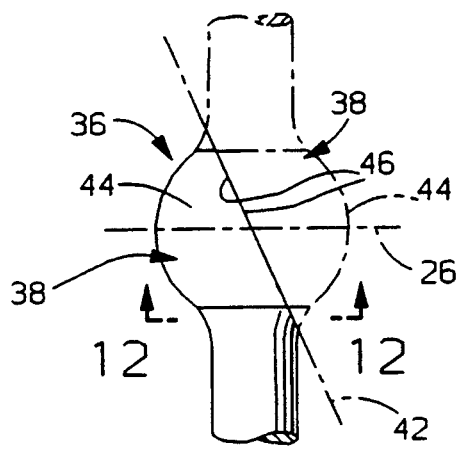
FIG. 11 is similar to FIG. 9, but with a dividing plane tilted to a greater degree from the central plane.
Figure 12:
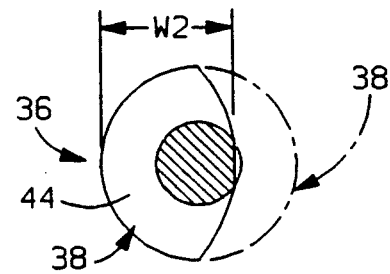
FIG. 12 shows a sectional view taken along line 12—12 of FIG. 11.

Referring next to FIGS. 11 and 12, the purpose in dividing insert 36 is illustrated. A single segment 38 is shown is solid lines, with the adjoined position of the other shown in dotted lines. The location of the pocket central plane 26 is shown, which would be coincident with the central plane of the partial sphere formed by the adjoined segments 38. The shape of a projection of a single segment 38 along the axis of its withdrawal rod 40 and into the pocket central plane 26 is shown in FIG. 12. It is more than a half circle, but significantly less than a whole circle, which is shown by a dotted line for purposes of comparison. Thus, the projection may be said to have an effective width, indicated at W2, which is less than the interior width of the pocket 22 as defined above, that is, less than the diameter of the ball 24 to be retained. The advantage of the reduced effective width is described further below.

Figure 9:
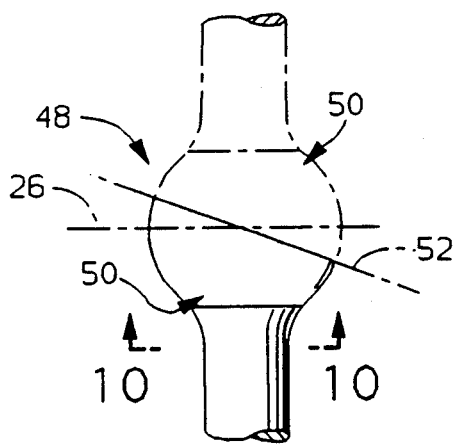
FIG. 9 shows a side view of a divided shaping insert whose dividing plane is tilted relatively little from the central plane.
Figure 10:
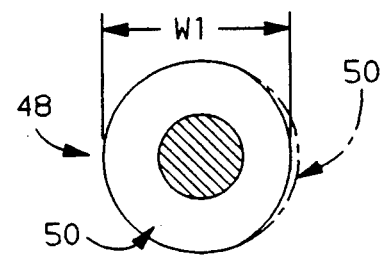
FIG. 10 shows a sectional view taken along line 10—10 of FIG. 9.

Referring next to FIGS. 9 and 10, an alternate embodiment of the shaping insert is described in somewhat less detail. A molding insert, indicated generally at 48, is divided into two equal segments 50 along a dividing plane 52. Insert 48 has the same total spherical shape as insert 36, but the plane 52 along which it is divided is tilted out of pocket central plane 26 to a lesser degree. Consequently, a projection of one segment 50 into central plane 26, while still less than the interior width of pocket 22 and less than a full circle, is wider than for insert 36, and indicated at W1.

Figure 13:
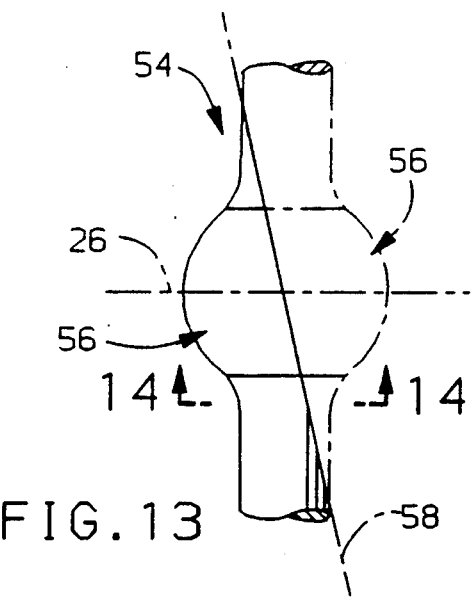
FIG. 13 is similar to FIG. 11, but with a dividing plane tilted to a greater degree from the central plane.
Figure 14:
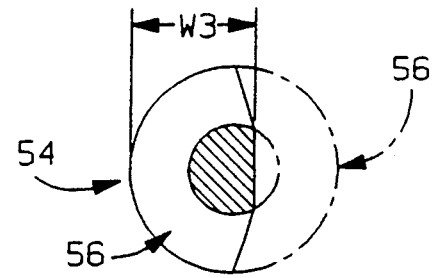
FIG. 14 shows a sectional view taken along line 14—14 of FIG. 13.

Referring next to FIGS. 13 and 14, another alternate embodiment of the shaping insert is shown. A generally spherical insert 54 is divided into two equal segments 56 along a dividing plane 58 tilted farther out of pocket central plane 26. Consequently, the projection of a segment 56 into central plane has an effective width W3 that is less than W2.

Figure 15:
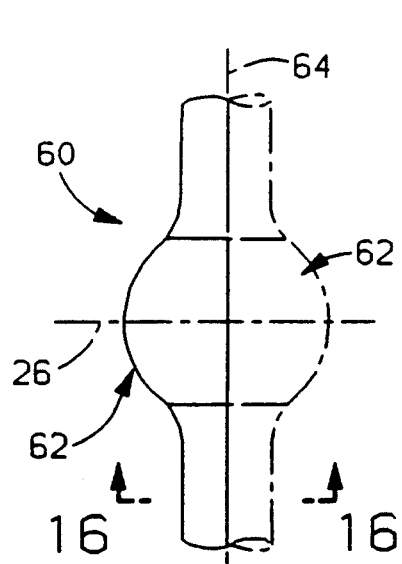
FIG. 15 is similar to FIG. 13, but with a dividing plane perpendicular to the central plane.
Figure 16:
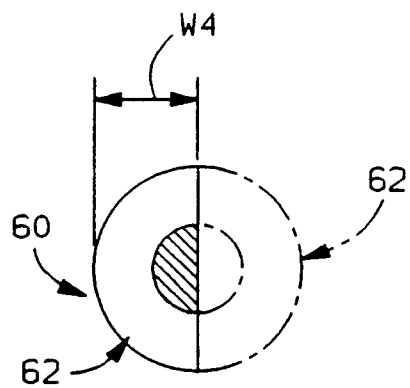
FIG. 16 shows a sectional view taken along line 16—16 of FIG. 15.

Referring next to FIGS. 15 and 16, the pattern is further illustrated. A generally spherical insert 60 is divided into two equal segments 62 along a plane 64 tilted out of pocket central plane 26 to the maximum degree possible, that is, perpendicular to it. Plane 62 is not tilted out of pocket central axis 28, however, but includes it, and would thus not be considered a diagonal plane. Then, a projection of a segment 62 into plane 26 is of minimal size, a half circle, with an effective width W4 that is least of all.

Figure 19:
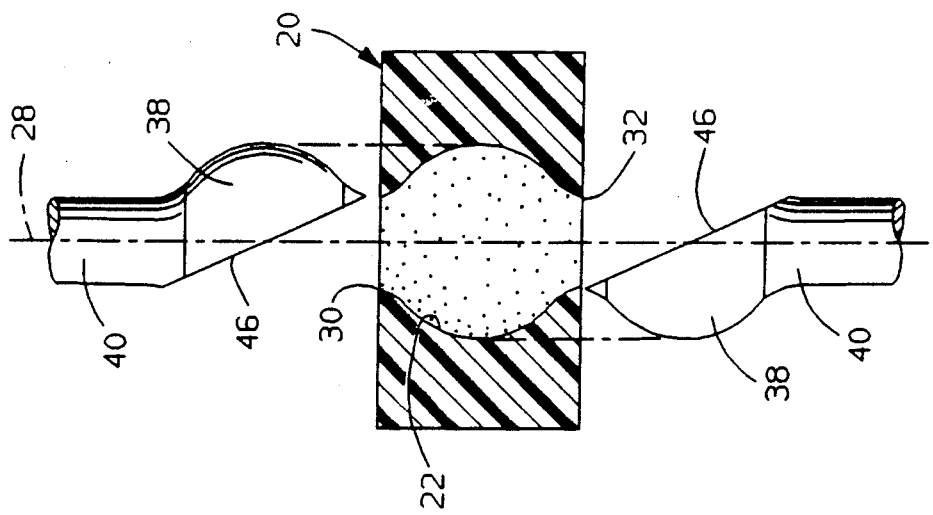
FIG. 19 is similar to FIG. 18, but with the other insert segment removed from the bearing separator material.
Figure 18:
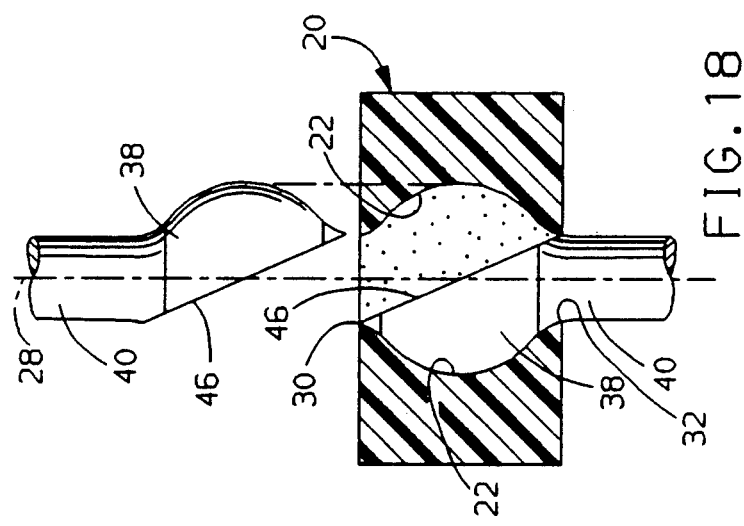
FIG. 18 is similar to FIG. 17, but with one insert segment removed from the bearing separator material.
Figure 17:
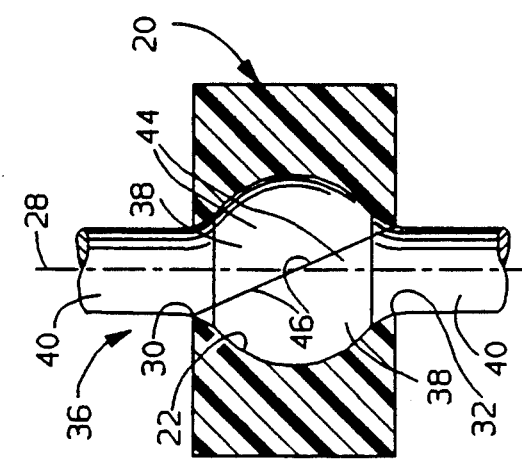
FIG. 17 shows a cross section of a divided shaping insert after the bearing separator material has been injected.

Referring next to FIGS. 17 through 19, the molding of pocket 22 is illustrated. Once the insert segments 38 have been provided, they are adjoined to remake the whole insert 36. Not illustrated are conventional main molds, into which one of each the insert segments 38 would be incorporated. The main molds would be closed off simultaneously with the insert segments 38 being adjoined so as to provide the cavity to form the main body of the separator 20, in a manner well known to those skilled in the art. The sloped guide surfaces 46 would slide together smoothly as the insert segments 38 were brought together. Next, a suitable hot liquid plastic material would be injected into the main mold cavities and around the adjoined segments 38, as shown in FIG. 17. The segment outer surfaces 44 form the concave interior of the pocket 22, and the withdrawal rods 40 form the pocket openings 30 and 32. Next, one insert segment 38 is pulled up along the pocket central axis 28, along with the main mold of which it is a part, as shown in FIG. 18. As it exits the pocket upper opening 30, the first withdrawn segment 38 causes less stress than would the conventional insert 14 described above. Upper opening 30 would have to stretch to an extent, since it is smaller than the interior width of pocket 22. However, upper opening 30 would not have to stretch around its entire perimeter by the differential X, as it would to pass insert 14, because of the reduced effective width of segment 38. Finally, as shown in FIG. 19, the remaining insert segment 38 would be axially withdrawn through pocket lower opening 32, which would experience a similarly reduced stretch and stress. As a practical matter, as will be understood by those skilled in the art, separator 20 would likely be pushed off of the remaining insert segment 38 and its respective mold by ejector pins, not illustrated.

The method could be practiced to produce bearing separators for other rolling elements as well, such as cylindrical or tapered rollers. Rollers, too, have a predetermined central cross section, although it would be rectangular or trapezoidal rather than circular. Any of the alternate inserts 36, 48, 54 or 60 could be used. While 60 provides the least effective width, its segments 62 would have the potential to hit one another as they were slid together, because of their flat ends. Insert segments like 38 still significantly reduced post molding withdrawal stress, but also have the sloped surfaces 46 to guide them together without interference as they are adjoined. A spherical shaping insert could be divided along a plane that did not pass through the exact center of the sphere. Segments so produced would be asymmetrical, one having an effective width greater than the other, although each would have an effective width less than the interior width of the pocket. This might be done if one pocket opening had a peripheral edge that was thicker and less resilient, and less able to withstand stress. As noted above, pocket 22 has non conforming ends 34, which do not show in the cross section of FIG. 6. A shaping insert designed to mold such a pocket would have two opposed trunnion like projections perpendicular to the withdrawal rods 40, sticking out to the side from the main spherical portion of the insert. The trunnions, too, would be divided in diagonal fashion along the same tilted plane. Since the pocket ends 34 are not concave, the trunnions could be easily withdrawn from the pocket, without resistance. Furthermore, as the separator was pushed off of the remaining insert segment, it could rock or pivot off of the trunnions, allowing the surface of the pocket that was concave to rotate off of the spherical part of the remaining insert segment with even less resistance. Thus, it will be understood that it is not intended to limit the invention to just the embodiment disclosed.

The embodiments of the invention in which an exclusive property or privilege is claimed are defined as follows:

1. A method of injection molding a one piece, rigid plastic bearing separator having a plurality of complete pockets, each of which is designed to wrap a rolling element with a cross section of predetermined width, said pockets each having a central plane with an interior width that is substantially equal to said predetermined width, said pockets each also having a pair of openings opposed along an axis perpendicular to said central plane, said method comprising the steps of, providing a shaping insert with an outer surface that substantially conforms to each of said pockets, dividing each of said shaping inserts into two segments along a plane that is tilted out of said central plane, so that a projection of each insert segment along said axis and into said central plane will have an effective width less than said pocket interior width, adjoining said insert segments along said dividing plane, injection molding a suitable material around the outer surface of said adjoined insert segments so as to create said pockets, and, withdrawing each said insert segment along said axis through a respective opposed opening, whereby each respective pocket opening is stressed by the withdrawal of said insert segment less than it would be by withdrawing an undivided shaping insert.

2. A method of injection molding a one piece, rigid plastic bearing separator having a plurality of complete pockets, each of which is designed to wrap a rolling element with a cross section of predetermined width, said pockets each having a central plane with an interior width that is substantially equal to said predetermined width, said pockets each also having a pair of openings opposed along an axis perpendicular to said central plane, said method comprising the steps of, providing a shaping insert with an outer surface that substantially conforms to each of said pockets, dividing each of said shaping insert into two segments along a diagonal plane, so that a projection of each insert segment along said axis and into said central plane will have an effective width less than said pocket interior width, and so that each insert segment has a sloped guiding surface, adjoining said insert segments along said sloped guiding surfaces, injection molding a suitable material around the outer surface of said adjoined insert segments so as to create said pockets, and, withdrawing each said insert segment along said axis through a respective opposed opening, whereby each respective pocket opening is stressed by the withdrawal of said insert segment less than it would be by withdrawing an undivided shaping insert.

* * * * *